(12) United States Patent
Kang et al.

(10) Patent No.: US 12,110,240 B2
(45) Date of Patent: Oct. 8, 2024

(54) CAPACITIVE DEIONIZATION PROCESS

(71) Applicant: DOOSAN ENERBILITY CO., LTD, Changwon (KR)

(72) Inventors: Wee Kwan Kang, Yongin (KR); Ho Yong Jo, Yongin (KR); Jang Yong You, Suwon (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 205 days.

(21) Appl. No.: 17/534,301

(22) Filed: Nov. 23, 2021

(65) Prior Publication Data

US 2022/0348482 A1 Nov. 3, 2022

(30) Foreign Application Priority Data

Apr. 29, 2021 (KR) ........................ 10-2021-0055701

(51) Int. Cl.
| | |
|---|---|
| *C02F 1/469* | (2023.01) |
| *C01D 15/02* | (2006.01) |
| *C01D 15/08* | (2006.01) |
| *C02F 1/52* | (2023.01) |
| *C02F 101/10* | (2006.01) |

(52) U.S. Cl.
CPC ............ *C02F 1/4691* (2013.01); *C01D 15/02* (2013.01); *C01D 15/08* (2013.01); *C01P 2002/72* (2013.01); *C02F 2001/5218* (2013.01); *C02F 2101/10* (2013.01)

(58) Field of Classification Search
CPC .................................................. C02F 1/4691
See application file for complete search history.

(56) References Cited

U.S. PATENT DOCUMENTS

| | | | | |
|---|---|---|---|---|
| 5,538,611 | A | * 7/1996 | Otowa ................... | C02F 1/4691 204/554 |
| 2008/0185294 | A1 | * 8/2008 | Cai ........................ | C02F 1/4604 205/742 |
| 2011/0044882 | A1 | * 2/2011 | Buckley ................. | C01D 15/02 423/481 |

FOREIGN PATENT DOCUMENTS

| | | |
|---|---|---|
| JP | 2010517746 A | 5/2010 |
| KR | 101136816 B1 | 4/2012 |
| KR | 1020120051729 A | 5/2012 |
| KR | 101298853 B1 | 8/2013 |

(Continued)

OTHER PUBLICATIONS

English translation of KR-20190080543 (Year: 2019).*
(Continued)

*Primary Examiner* — Salil Jain
(74) *Attorney, Agent, or Firm* — Harvest IP Law, LLP

(57) ABSTRACT

A capacitive deionization process is provided. The capacitive deionization process includes a charging step of applying power to a capacitive deionization apparatus in a charging state and supplying charge water containing target dissolved ions to be precipitated to the capacitive deionization apparatus for a predetermined period of time, a discharging step of applying power to the capacitive deionization apparatus in a discharging state and supplying discharge water in which the target dissolved ions are in a saturated state to the capacitive deionization apparatus for a predetermined period of time, and a crystal recovery step of recovering a crystal of the target dissolved ions precipitated in the capacitive deionization apparatus and/or the discharge water.

12 Claims, 9 Drawing Sheets

(56) References Cited

FOREIGN PATENT DOCUMENTS

| KR | 101711854 B1 | 2/2017 | | |
|---|---|---|---|---|
| KR | 1020190080543 A | 7/2019 | | |
| KR | 102011115 B1 | 8/2019 | | |
| WO | WO-9713568 A1 * | 4/1997 | ............ | B01D 15/00 |
| WO | 2013153692 A1 | 10/2013 | | |

OTHER PUBLICATIONS

English Translation of CN-111115664 (Year: 2020).*
Graber et al., "Behavior of LiOH•H2O crystals obtained by evaporation and by drowning out," Cryst. Res. Technol. 43, No. 6, 616-625 (2008) (Year: 2008).*
English Translation of CN 107653378 (Year: 2018).*

* cited by examiner

CAPACITIVE DEIONIZATION PROCESS

CROSS REFERENCE TO RELATED APPLICATION

This application claims priority to Korean Patent Application No. 10-2021-0055701, filed on Apr. 29, 2021, the disclosure of which is incorporated herein by reference in its entirety.

FIELD

Apparatuses and methods consistent with exemplary embodiments relate to a capacitive deionization process using a capacitive deionization (CDI) technology that crystallizes by concentrating ions of valuable resources contained in feed water to a supersaturated state, thereby recovering useful and valuable resources while solving the cost and environmental problems in disposing feed water containing contaminants.

BACKGROUND

It is desirable to discharge or reuse feed water containing aquatic pollutants in a sewage or wastewater treatment plant through appropriate treatment to prevent environmental pollution and supplement scarce available water resources. Various processes such as physical, chemical, and biological precipitation, filtration, oxidation, dialysis, and adsorption can be applied to treat feed water containing aquatic pollutants. The wastewater treatment method is appropriately designed in consideration of the type and concentration of substances contained in the feed water, and for example, if a large amount of inorganic salts are contained, a capacitive deionization (CDI) technology is applied.

The concept of the capacitive deionization technology is illustrated in FIG. 1. Referring to FIG. 1, feed water contains various inorganic salts, and the feed water (also referred to as 'feed') is introduced into a capacitive deionization apparatus. The capacitive deionization apparatus includes a spacer for forming and maintaining a space through which feed flows, and an anode and a cathode are disposed opposite to each other on both sides of the spacer. An anion exchange membrane is disposed adjacent to the anode, and a cation exchange membrane is disposed adjacent to the cathode. Here, the anion exchange membrane is a membrane having selectivity to pass and retain only anions, and the cation exchange membrane is a membrane having opposite property and is a membrane having selectivity to pass and retain only cations.

In the capacitive deionization apparatus, when positive and negative power is applied to the anode and cathode, respectively, anions among the inorganic salts contained in the feed are electrically attracted to the anode so that the anions pass through the anion exchange membrane and are retained in the anode region. In contrast, cations in the feed are attracted to the cathode so that the cations are retained in the anode region. In this way, in a charging state in which the anode and the cathode are applied with positive power and negative power, respectively, the anions and the cations are separately accumulated in the capacitive deionization apparatus so that the dissolved ions of the feed passing through the capacitive deionization apparatus are reduced. That is, the feed is purified in the charging state of the capacitive deionization apparatus.

On the other hand, the capacitive deionization apparatus needs to be regenerated on a regular basis. The regeneration process is a process to recover the purification capacity of the capacitive deionization apparatus by discharging the anions and the cations accumulated in the anode and the cathode. The regeneration process is performed in a discharging state in which an anode and a cathode of the capacitive deionization apparatus is applied with negative power and positive power, respectively. In the discharging state, anions are discharged to the outside while passing through the anion exchange membrane by repulsive force of the negative power, whereas cations are discharged from the anode according to the same principle. The discharged high-concentration feed needs to be discharged after a separate treatment.

As described above, the capacitive deionization technology is used to purify feed to an appropriate concentration by removing various types of dissolved ions from the feed through capacitive adsorption. The present disclosure relates to a capacitive deionization process for crystallizing ions of valuable resources included in feed water in a supersaturated state, using the capacitive deionization technology, and the capacitive deionization process is newly derived from approach that is completely different from the concept of purifying feed water.

SUMMARY

Aspects of one or more exemplary embodiments provide a capacitive deionization process that crystallizes by concentrating ions of valuable resources contained in feed water to a supersaturated state, thereby recovering useful and valuable resources while solving the cost and environmental problems in disposing feed water containing contaminants Additional aspects will be apparent in part in the description which follows and, in part, will become apparent from the description from the following description, or may be learned by practice of the exemplary embodiments.

According to an aspect of an exemplary embodiment, there is provided a capacitive deionization process including: a charging step of applying power to a capacitive deionization apparatus in a charging state and supplying charge water containing target dissolved ions to be precipitated to the capacitive deionization apparatus for a predetermined period of time; a discharging step of applying power to the capacitive deionization apparatus in a discharging state and supplying discharge water in which the target dissolved ions are in a saturated state to the capacitive deionization apparatus for a predetermined period of time; and a crystal recovery step of recovering a crystal of the target dissolved ions precipitated in the capacitive deionization apparatus and/or the discharge water.

In the discharging step, the discharge water may contain the target dissolved ions at a high concentration equal to or higher than a saturation concentration.

The concentration of the target dissolved ions in the discharge water may be increased by repeating the charging and discharging steps.

The discharge water may contain the target dissolved ions by dissolving a target salt in the discharge water.

The charge water may be wastewater containing the target dissolved ions.

The wastewater may be purified through the charging step.

The charge water may be a solution in which a solid containing a salt of the target dissolved ions and other impurities is dissolved.

The capacitive deionization apparatus may be a batch type apparatus.

The capacitive deionization apparatus may be connected to a charge water tank containing the charge water and a discharge water tank containing the discharge water.

The discharge water accommodated in the discharge water tank may be circulated through the capacitive deionization.

The crystal recovery step may be performed after repeating the charging step and the discharging step a predetermined number of times or for a predetermined time.

The discharging step may be performed after the charge water in the capacitive deionization apparatus is completely discharged in the charging step.

The discharging step may be performed after the charge water in the capacitive deionization apparatus is completely discharged in the charging step.

The charging step may be performed after the discharge water in the capacitive deionization apparatus is completely discharged in the discharging step.

The target dissolved ions may be lithium ions.

The crystal precipitated from the target dissolved ions may be lithium carbonate or lithium hydroxide.

According to the capacitive deionization process according to the exemplary embodiments, the capacitive deionization technique is used to precipitate ions of valuable resources contained in feed water instead of purifying feed water containing various aquatic pollutants, thereby utilizing precipitated material as valuable resources. For example, the exemplary embodiment has several advantages of environmental friendliness and cost reduction because high-purity crystals can be obtained with low energy compared to the related art techniques using evaporation crystallization or cooling crystallization.

In addition, because there is no need to post-process and discharge high-concentration wastewater concentrated by the capacitive deionization method, the cost and environmental problems associated with the existing high-concentration wastewater treatment can be solved.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
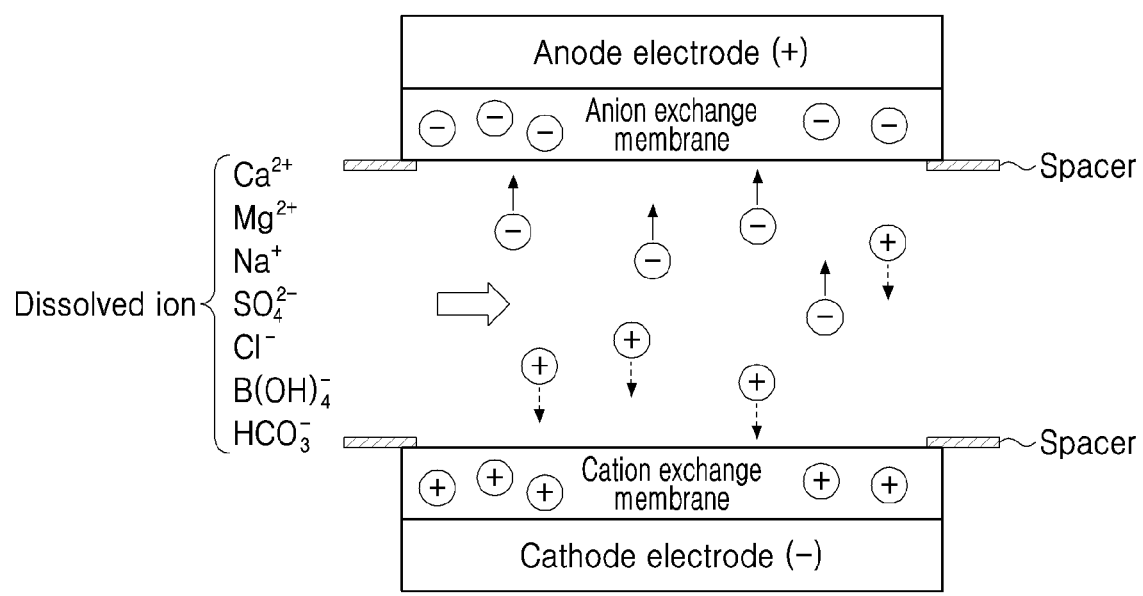
FIG. 1 is a diagram illustrating the concept of a capacitive deionization technology.

Various modifications and various embodiments will be described in detail with reference to the accompanying drawings. However, it should be noted that the various embodiments are not for limiting the scope of the disclosure to the specific embodiment, but they should be interpreted to include all of modifications, equivalents or substitutions of the embodiments included within the spirit and scope disclosed herein.

Unless otherwise defined, the terms including technical and scientific terms used herein have the same meaning as would be generally understood by those skilled in the relevant art. However, these terms may vary depending on the intentions of the person skilled in the art, legal or technical interpretation, and the emergence of new technologies. In addition, some terms are arbitrarily selected by the applicant. These terms may be construed per the meaning defined or described herein and, unless otherwise specified, may be construed on the basis of the entire contents of this specification and common technical knowledge in the art.

The terminology used herein is for the purpose of describing particular embodiments only and is not intended to limit the scope of the disclosure. As used herein, the singular forms "a", "an", and "the" are intended to include the plural forms as well unless the context clearly indicates otherwise. In this specification, the terms such as "comprises", "includes" and/or "have/has" should be construed as designating that there are such features, regions, integers, steps, operations, elements, components, and/or a combination thereof in the specification, not to exclude the presence or possibility of adding of one or more of other features, regions, integers, steps, operations, elements, components, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, exemplary embodiments will be described in detail with reference to the accompanying drawings. It is noted that like reference numerals refer to like parts throughout the various figures and exemplary embodiments. In certain embodiments, a detailed description of known functions and configurations that may obscure the gist of the present disclosure will be omitted. For the same reason, some of the elements in the drawings are exaggerated, omitted, or schematically illustrated.

Figure 2:
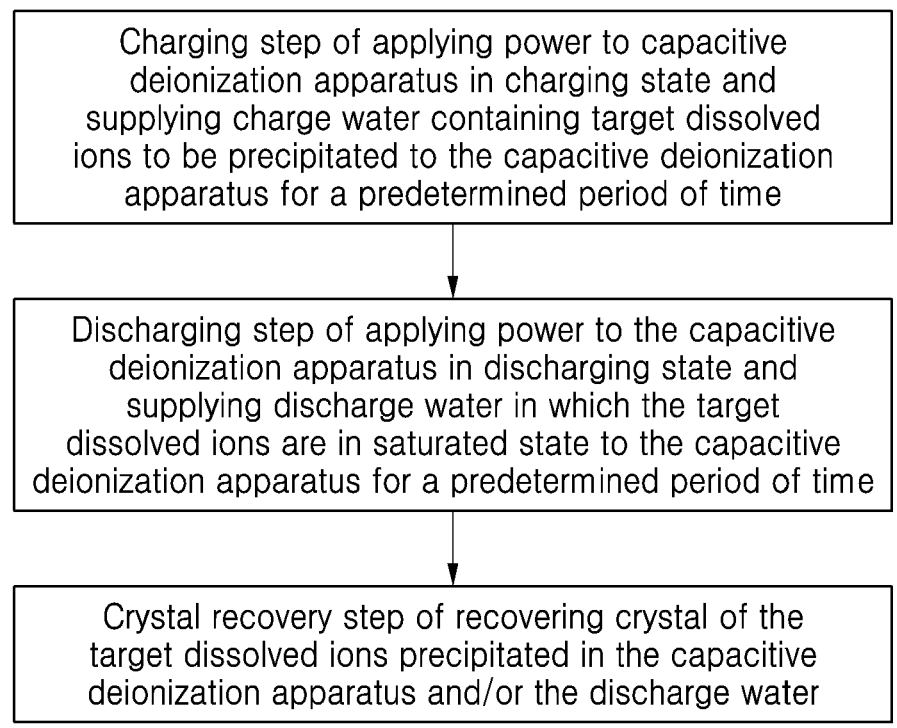
FIG. 2 is a view illustrating an overall flow of a capacitive deionization process.
Figure 3:
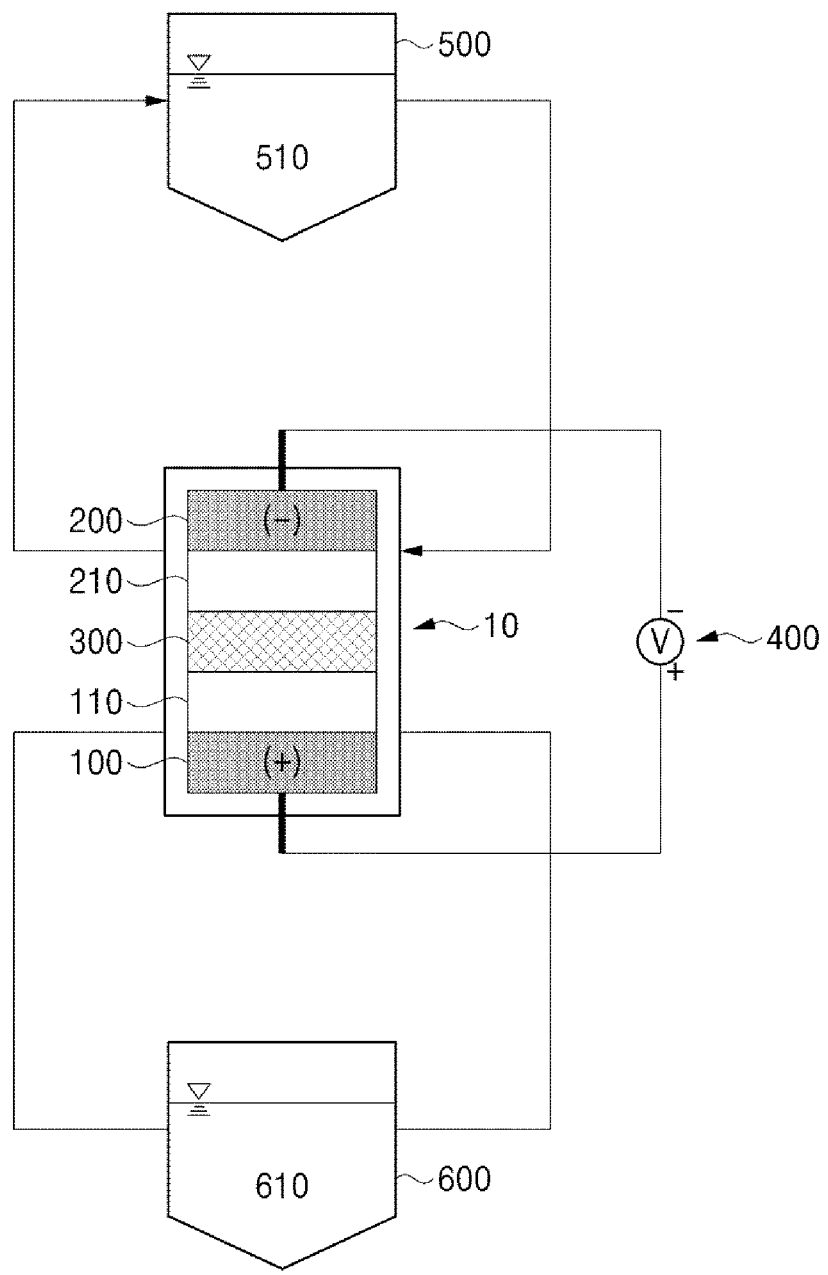
FIG. 3 is a view illustrating a charging step of FIG. 2.
Figure 4:
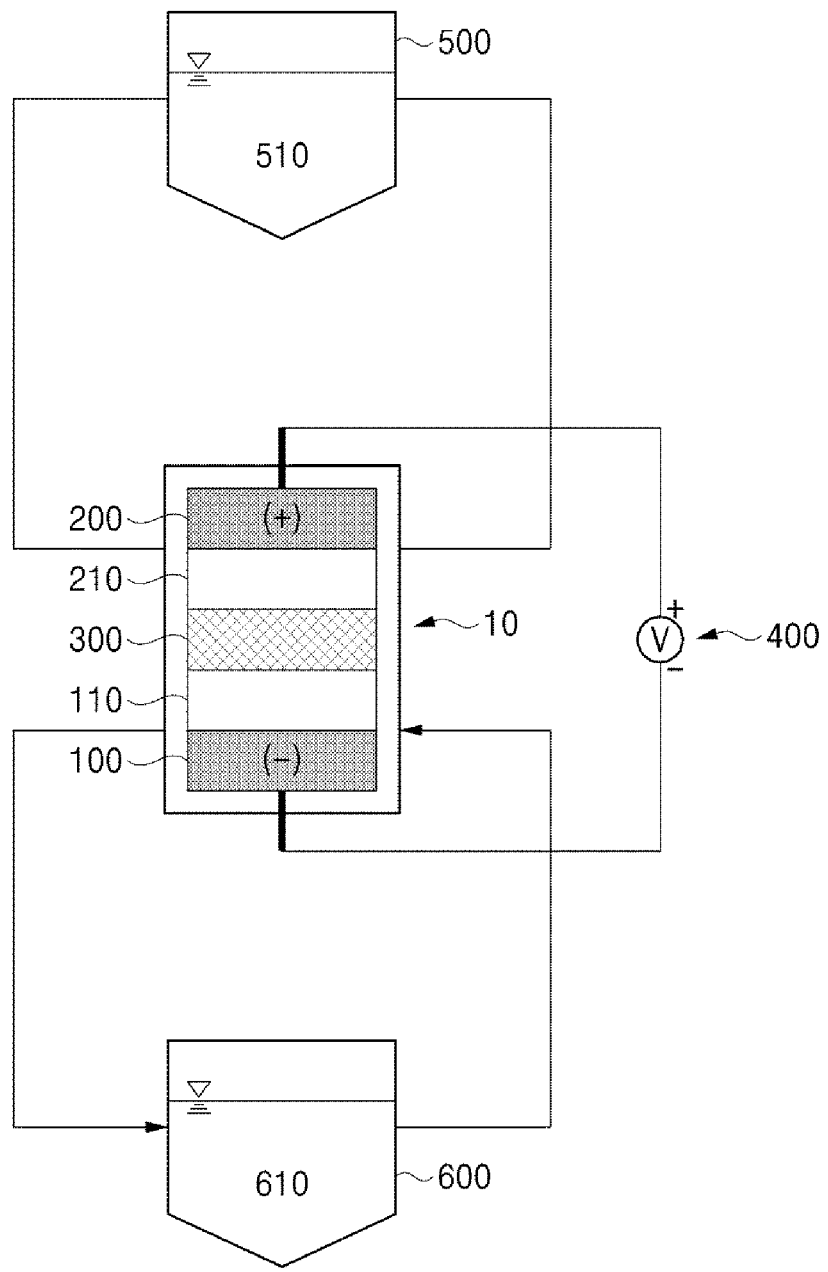
FIG. 4 is a view illustrating a discharging step of FIG. 2.

FIG. 2 is a flow chart illustrating an overall flow of a capacitive deionization process according to an exemplary embodiment. FIG. 3 is a view illustrating a charging step of FIG. 2. FIG. 4 is a view illustrating a discharging step of FIG. 2. Referring to FIG. 2, the capacitive deionization process includes a charging step, a discharging step, and a crystal recovery step.

Referring to FIGS. 2 and 3, in the charging step, power from a power source 400 is applied to a capacitive deionization apparatus 10 in a charging state, and charge water 510 containing target dissolved ions to be precipitated by the capacitive deionization apparatus 10 is supplied for a predetermined time.

Here, the basic configuration of the capacitive deionization apparatus 10 is the same as that illustrated in FIG. 1. That is, the capacitive deionization apparatus 10 includes a spacer 300 for forming and maintaining a space through which feed flows, and an anode 100 and a cathode 200 are disposed opposite to each other on both sides of the spacer 300. An anion exchange membrane 110 is disposed adjacent to the anode 100, and a cation exchange membrane 210 is disposed adjacent to the cathode 200. Here, the anion exchange membrane 110 is a membrane having selectivity to pass and retain only anions, and the cation exchange membrane 210 is a membrane having opposite property to have selectivity for passing and retaining only cations.

In addition, the stage of applying power from the power source 400 to the capacitive deionization apparatus 10 in the charging state is applying positive power and negative power from the power source 400 to the anode 100 and cathode 200, respectively. In this charging state, anions among the inorganic salts contained in the feed are electrically attracted to the anode 100 so that the anions pass through the anion exchange membrane 110 and are retained in the anode region, whereas cations in the feed are attracted to the cathode 200 in the opposite direction so that the cations are retained in the anode region.

Here, the charge water 510 is a solution supplied when the capacitive deionization apparatus 10 is in the charging state. The charge water 510 contains target dissolved ions to be precipitated in the capacitive deionization apparatus 10. The charging state is maintained for a time sufficient for a desired level of capacitive adsorption to occur. Compared to discharge water 610, the concentration of target dissolved ions included in the charge water 510 is relatively low.

Referring to FIGS. 2 and 4, in the discharging step, power from the power source 400 is applied to the capacitive deionization apparatus 10 in a discharging state 10, and discharge water 610 containing a relatively high-concentration target dissolved ions is applied to the capacitive deionization apparatus 10 for a predetermined time.

As illustrated in FIG. 1, when the capacitive deionization apparatus 10 is in the discharging state, the anions and cations accumulated in the anode and the cathode are discharged out of the electrodes 100 and 200 and the exchange membranes 110 and 210. That is, in the discharging state, negative power and positive power are applied to the anode 100 and the cathode 200 from the power source 400, respectively, so that anions are discharged to the outside while passing through the anion exchange membrane 100 by repulsive force of the negative power from the power source 400, whereas cations are discharged from the anode 100 according to the same principle.

Here, the discharge water 610 is a solution supplied when the capacitive deionization apparatus 10 is in the discharging state. The discharge water 610 contains target dissolved ions having a higher concentration than that of the charge water 510. The discharging step is maintained for a time sufficient to discharge the adsorbed dissolved ions.

Based on the target dissolved ions, the charging step and the discharging step may be called a material transfer state in which materials are transferred from the low concentration side to the high concentration side. That is, in the charging step, the target dissolved ions contained in the low-concentration charge water 510 are transferred from the charge water 510 to the electrodes 100 and 200 of the capacitive deionization apparatus 10 by electric energy supplied to the capacitive deionization apparatus 10. The target dissolved ions transferred from the charge water 510 are retained in the capacitive deionization apparatus 10 so long as the charging state is maintained.

The discharging step is a stage in which the target dissolved ions retained in the capacitive deionization apparatus 10 are transferred to discharge water 610 in which the target dissolved ions are saturated. The transfer of the target dissolved ions to the discharge water 610 is performed by electrical energy. That is, the dissolved ions are forcibly transferred to high-concentration discharge water 610 by repulsive force generated by the electrodes 100 and 200 of the capacitive deionization apparatus 10, so that the concentration of the target dissolved ions in the discharge water 610 increases to a supersaturated state.

As described above, according to the exemplary embodiment, the capacitive deionization apparatus 10 serves as a material pump that extracts target dissolved ions from the low-concentration charge water 510 and transfers the same to the discharge water 610 that is in a saturated state. Here, the charge water 510 serves as a source for increasing the target dissolved ions of the discharge water 610.

Figure 5:
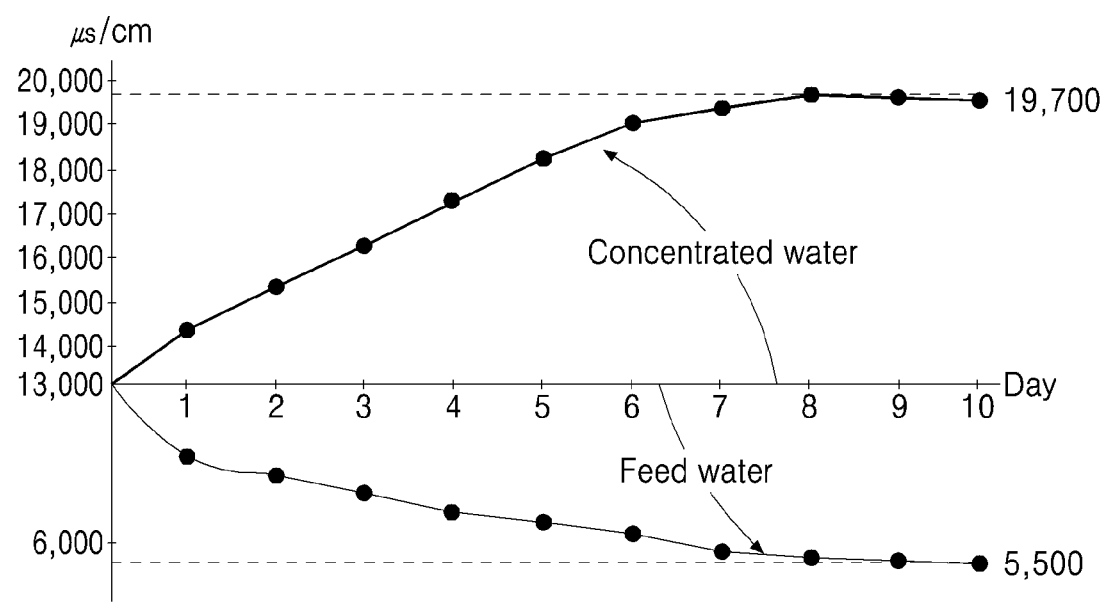
FIG. 5 is a graph illustrating experimental results of shifting a concentration of target dissolved ions using a capacitive deionization apparatus.

FIG. 5 is a graph illustrating experimental results in which the concentration of target dissolved ions (e.g., lithium ions) is shifted using the capacitive deionization apparatus 10. Here, it is understood that feed water corresponds to the charge water 510, and concentrated water corresponds to the discharge water 610. Referring to FIG. 5, in a state in which feed water and concentrated water have the same concentration (e.g., conductivity of 13,000 μs/cm), the concentration of the concentrated water can be raised to a supersaturated state by transferring lithium ions from the feed water to the concentrated water through the capacitive deionization apparatus 10. Lithium ions in the supersaturated state in the concentrated water were precipitated into crystals, so that the concentration of the concentrated water was ultimately maintained at a saturation concentration (e.g., about 19,700 μs/cm).

Figure 6:
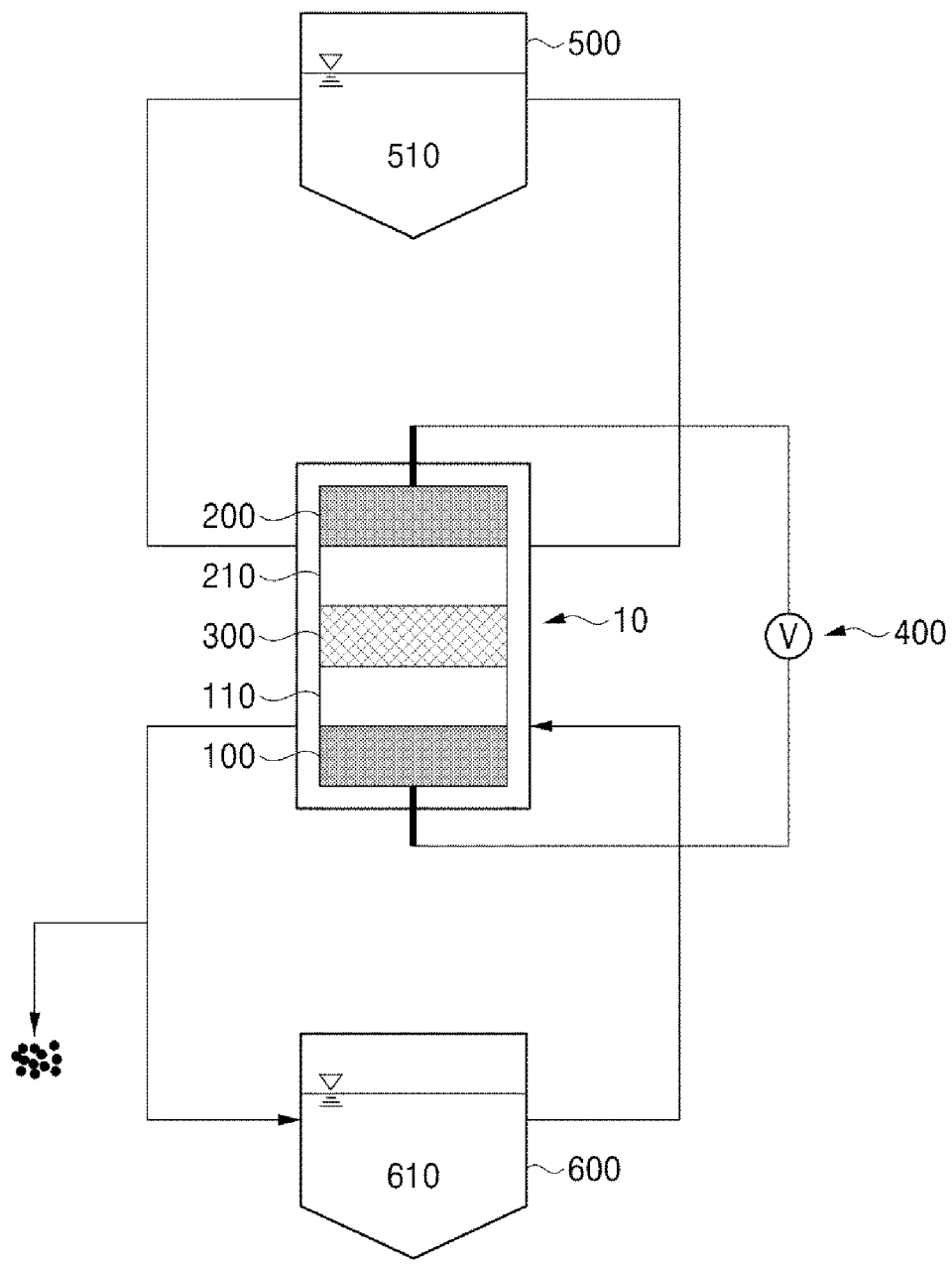
FIG. 6 is a view illustrating a crystal recovery step of FIG. 2.

When the charging and discharging steps are sufficiently performed, the target dissolved ion concentration of the discharge water 610 rises above a threshold value, i.e., to a super-saturation concentration at which the target dissolved ions above the saturation concentration are precipitated into crystals. FIG. 6 is a view illustrating a crystal recovery step of FIG. 2. The crystal recovery step is a step of recovering the precipitated crystals of the target dissolved ions in the discharge water 610. Crystals can be easily recovered by filtering the discharge water 610, and crystals remaining minutely in the capacitive deionization apparatus 10 may not be recovered in consideration of an economical aspect of operating the apparatus.

Target dissolved ions can be selectively precipitated for economically useful valuable resources according to the exemplary embodiment. For example, by setting lithium, which is a core material of a battery, as a target dissolved material, valuable resources in a waste battery according to the exemplary embodiment can be effectively reused.

Here, the initial discharge water 610 preferably includes a high concentration of target dissolved ions close to the saturation concentration. For example, the discharge water 610 may be preferably prepared at a high concentration of 90% or higher compared to the saturation concentration of the target dissolved ions. This is because it is advantageous in terms of economical efficiency of crystal recovery that the precipitation phenomenon occurs immediately, even if a small amount of target dissolved ions are added in the discharging step. Because the precipitated crystals originate from the charge water 510, the discharge water 610 continues to maintain the saturation concentration or higher even after the crystals are recovered.

The high-concentration discharge water 610 may be prepared through various methods. For example, the high-concentration discharge water 610 may be prepared in advance by repeating the above-described charging and discharging steps to increase the concentration of the target dissolved ions. This method is eco-friendly in that it recovers target dissolved ions contained in low-concentration charge water 510, but may not be efficient because a lot of energy is consumed in the recovery process. In consideration of this problem, it is possible to prepare high-concentration discharge water 610 having a concentration close to the saturation concentration or in a saturated state by dissolving target salts in discharge water 610 having a relatively low concentration. For example, a target salt may be dissolved in the low-concentration charge water 510 to prepare the high-concentration discharge water 610.

In addition, the charge water 510 may be prepared in various types of solutions containing target dissolved ions. For example, wastewater containing target dissolved ions can be used as the charge water 510, and in this case, because the wastewater is purified through the charging step, the exemplary embodiment serves to recover valuable resources and purify the wastewater.

Alternatively, the charge water 510 may be a solution in which a solid containing a target salt and other impurities is dissolved. In this case, the exemplary embodiment serves to separate target dissolved ions with high purity from a salt mixture of target dissolved ions and impurities. For example, the charge water 510 may be prepared by dissolving a nickel-cobalt-manganese (NCM)-lithium mixture of a waste battery, and lithium may be selectively separated from the charge water 510.

In a related art, techniques such as fractional distillation, evaporation and filtration, and reverse osmosis membrane have been used to separate a target substance from impurities, but most of these methods have the disadvantage of requiring a large-scale facility to increase energy consumption or maintenance cost. In contrast, the exemplary embodiment employs a capacitive deionization technique, so that commercial operation is possible even with a small-scale apparatus, and energy consumption is low, and maintenance cost is not high.

Further, according to an exemplary embodiment, the capacitive deionization apparatus 10 may be a batch type apparatus. That is, the capacitive deionization apparatus 10 can perform charging step and discharging step in a state in which inflow and outflow are blocked after filling the charge water 510 or the discharge water 610. This batch type capacitive deionization apparatus 10 has an advantage of being able to perform charging and discharging in a stable environment when a large amount of dissolved ions is contained in a solution (e.g., charge water, discharge water). However, it is understood that this does not mean that a continuous capacitive deionization apparatus cannot be applied to the present disclosure.

In addition, the capacitive deionization apparatus 10 may include a charge water tank 500 accommodating the charge water 510 and a discharge water tank 600 accommodating the discharge water 610. The charge water tank 500 and the discharge water tank 600 are connected to the capacitive deionization apparatus 10 such that a flow path of the charge water tank 500 is opened only in the charging step, and a flow path of the discharge water tank 600 is opened only in the discharging step.

For example, the discharge water 610 accommodated in the discharge water tank 600 circulates in the capacitive deionization apparatus 10, and the discharge water 610 is not consumed. That is, the discharge water 610 maintains a saturated state to precipitate target dissolved ions, and a target salt is precipitated and crystallized from the target dissolved ions collected in the charged water 510 rather than target dissolved ions in the discharged water 610, so the target dissolved ions in the discharge water 610 are not consumed.

On the other hand, the capacitive deionization process according to the exemplary embodiment may further include the following configuration in consideration of the efficiency in crystal recovery.

For example, in the capacitive deionization process, the crystal recovery step may be performed after the charging step and the discharging step are repeated a predetermined number of times or for a predetermined time. This is because collecting the precipitated crystals at once after a sufficient amount of crystals have been precipitated is effective in shortening idle time in operation of an apparatus.

In addition, the discharging step can be performed after the charge water 510 is completely discharged to the outside of the capacitive deionization apparatus 10 in the charging step, and then the discharge water 610 is filled in the capacitive deionization apparatus 10. This is because if the concentration of the discharge water 610 is lowered by adding the discharge water 610 to the remaining charge water 510, the time required to precipitate crystals increases unnecessarily. Here, the capacitive deionization apparatus 10 needs to maintain the charging state so that the dissolved ions collected therein are retained without leakage even when the charge water 510 is discharged.

For the same reason, when the crystal recovery step is performed after repeating the charging step and the discharging step a predetermined number of times or for a predetermined time, it is preferred to perform the discharging step repeatedly after completely discharging the charge water 510 of the capacitive deionization apparatus 10 in the charging step, and then perform the charging step after completely discharging the discharge water 610 of the capacitive deionization apparatus 10 in the discharging step.

Figure 7:
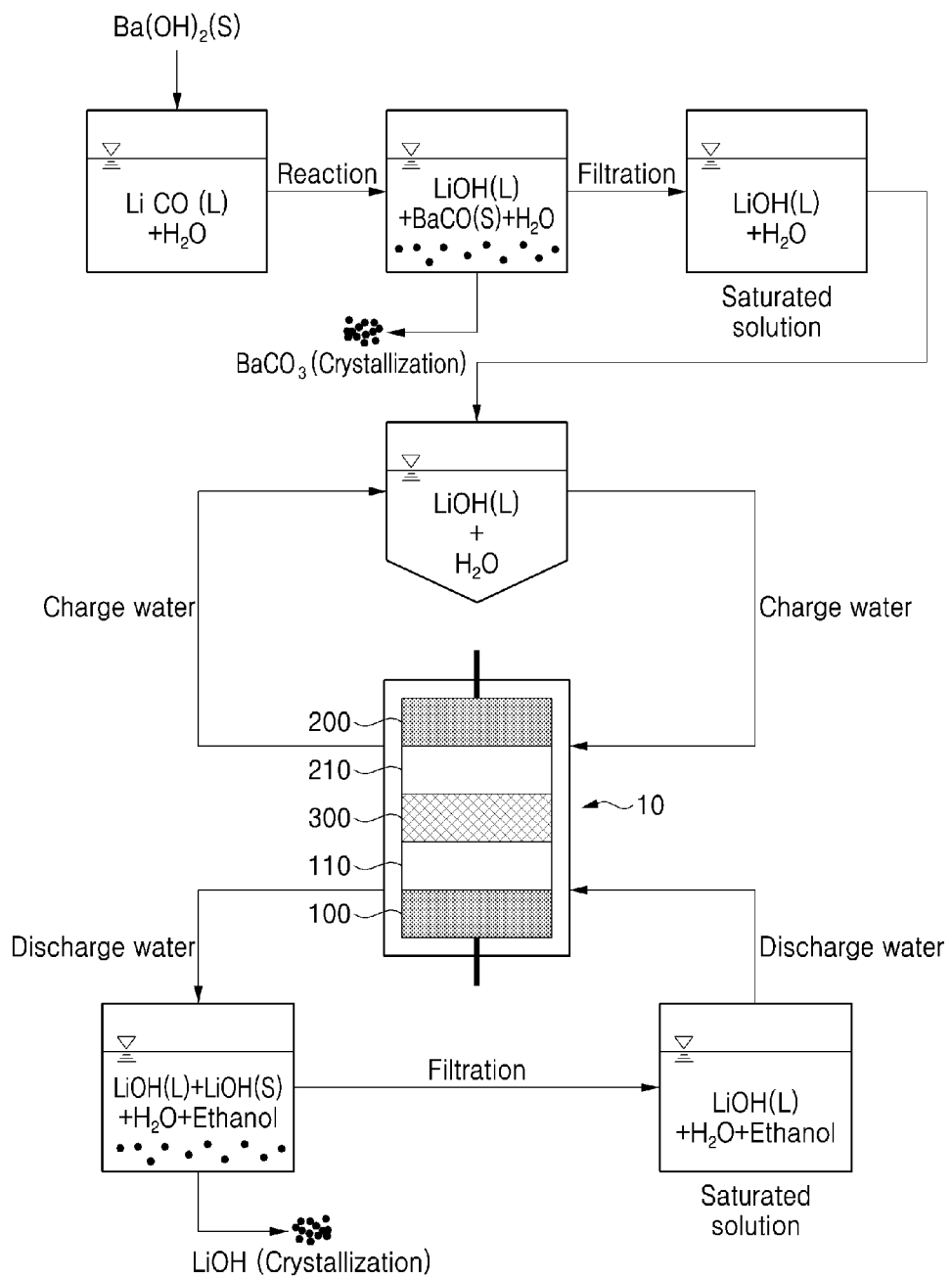
FIG. 7 is a diagram illustrating a system embodying an embodiment of the exemplary embodiment.

FIG. 7 is a view illustrating a system implementing an embodiment of the exemplary embodiment. Here, target dissolved ions are lithium ions and crystals precipitated from target dissolved ions are lithium carbonate. Referring again to FIG. 7, the nickel-cobalt-manganese-lithium mixture of a waste battery is heat-treated and then dissolved to prepare charge water 510, and lithium ions contained in the charge water 510 can be selectively separated into a crystal form of lithium carbonate.

Figure 9:
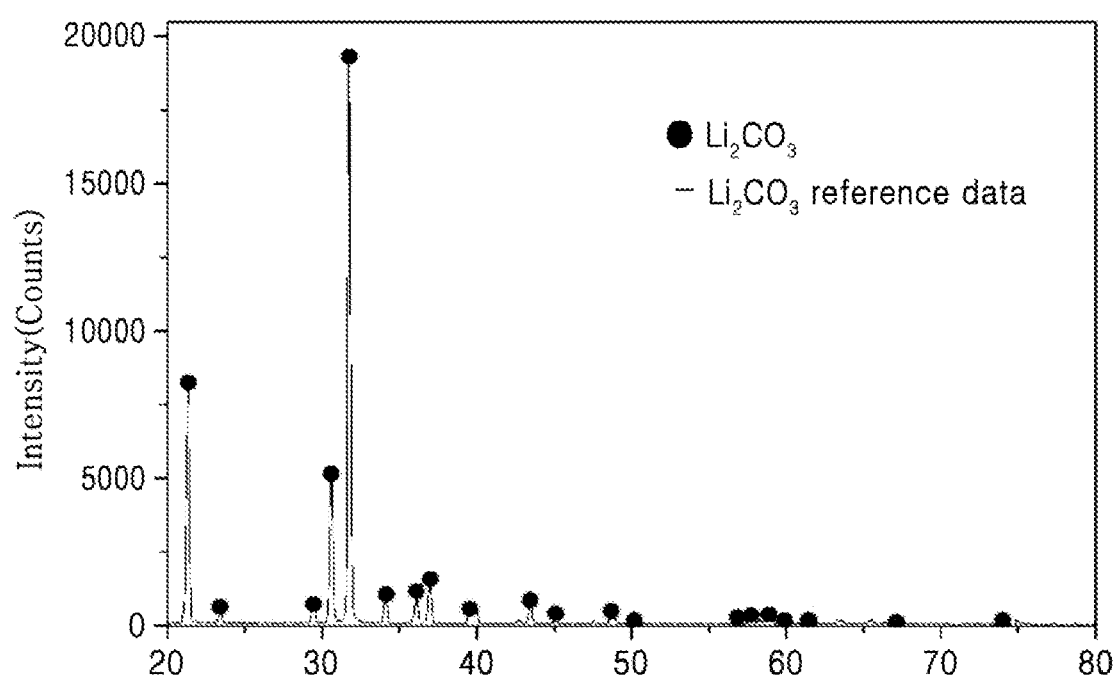
FIG. 9 is a graph illustrating XRD analysis results of lithium carbonate recovered by performing the exemplary embodiment of FIG. 7.

FIG. 9 is a graph illustrating XRD analysis results of lithium carbonate recovered by performing the exemplary embodiment of FIG. 7. Referring again to FIG. 9, the line in the graph represents reference data of lithium carbonate, and the black dots represent the result of X-ray diffraction analysis of the precipitated crystal. As a result of comparing the two types of data, it was confirmed that the precipitated crystal was lithium carbonate, and as a result of analyzing the purity, it showed a purity of 99.8% or higher, confirming that there was sufficient commerciality.

Figure 8:
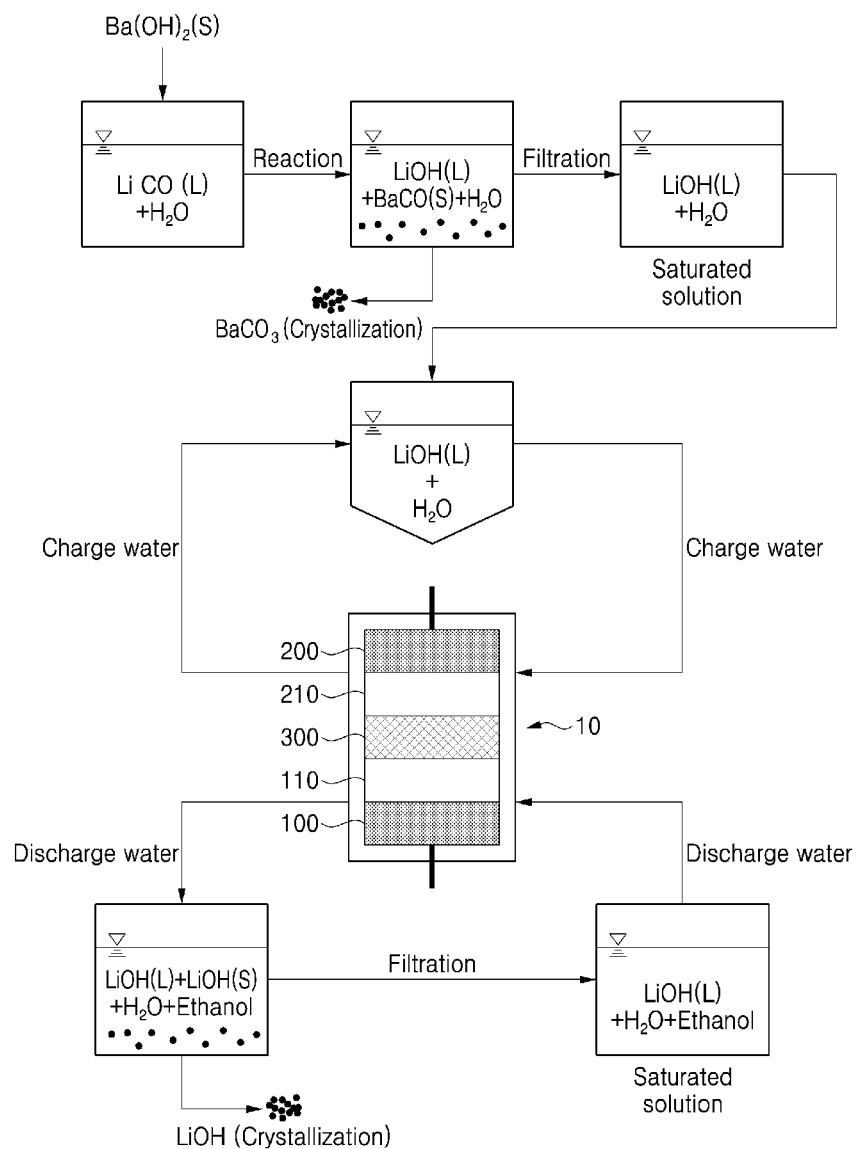
FIG. 8 is a diagram illustrating a system embodying another embodiment of the exemplary embodiment.

FIG. 8 is a view illustrating a system implementing another embodiment of the exemplary embodiment. The embodiment of FIG. 8 shows an example of recovering target dissolved ions into a crystal in the form of lithium hydroxide. Referring again to FIG. 8, the charge water 510 containing lithium hydroxide was prepared by adding barium hydroxide to convert lithium carbonate into lithium hydroxide. Because the discharge water 610 also contains lithium hydroxide, it is desirable to lower the solubility of lithium hydroxide in order to facilitate precipitation, so about 50% (v/v) of ethanol may be mixed with the discharge water 610.

While exemplary embodiments have been described with reference to the accompanying drawings, it is to be understood by those skilled in the art that various modifications in form and details may be made therein without departing from the sprit and scope as defined by the appended claims. Therefore, the description of the exemplary embodiments should be construed in a descriptive sense and not to limit the scope of the claims, and many alternatives, modifications, and variations will be apparent to those skilled in the art.

What is claimed is:

1. A capacitive deionization process comprising:
 a charge water providing step of providing charge water containing lithium ions and other impurities by first heat-treating nickel-cobalt-manganese-lithium mixture of a waste battery and then dissolving the heat-treated nickel-cobalt-manganese-lithium mixture of the waste battery;
 a discharge water providing step of providing discharge water containing lithium ions and ethanol such that lithium ions are in a saturated state in the discharge water, wherein a ratio of the ethanol in the total discharge water is maintained at a substantially constant 50%;
 a charging step of applying power to a capacitive deionization apparatus in a charging state and supplying the charge water to the capacitive deionization apparatus for a first predetermined period of time;
 a charge water removing step of removing, after the first predetermined period of time, the charge water from the capacitive deionization apparatus, wherein the capacitive deionization apparatus remains in the charging state until complete removal of the charge water from the capacitive deionization apparatus;
 a discharging step of applying power to the capacitive deionization apparatus in a discharging state and supplying the discharge water to the capacitive deionization apparatus for a second predetermined period of time; and
 a discharge water removing step of removing, after the second predetermined period of time, the discharge water from the capacitive deionization apparatus,
 a crystal recovery step of recovering a crystal of the lithium ions precipitated in the capacitive deionization apparatus and/or the discharge water, wherein the crystal recovery step is performed after repeating the charging step, the charge water removing step, the discharging step, the discharge water removing step for a third predetermined period of time.

2. The capacitive deionization process according to claim 1, wherein in the discharging step, the discharge water contains the lithium ions at a high concentration equal to or higher than a saturation concentration.

3. The capacitive deionization process according to claim 2, wherein the concentration of the lithium ions in the discharge water is increased by repeating the charging and discharging steps.

4. The capacitive deionization process according to claim 2, wherein the discharge water contains the lithium ions by dissolving a salt of the lithium hydroxide in the discharge water.

5. The capacitive deionization process according to claim 1, wherein the charge water is purified through the charging step.

6. The capacitive deionization process according to claim 1, wherein the capacitive deionization apparatus is a batch type apparatus.

7. The capacitive deionization process according to claim 6, wherein the capacitive deionization apparatus is connected to a charge water tank containing the charge water and a discharge water tank containing the discharge water.

8. The capacitive deionization process according to claim 7, wherein the discharge water accommodated in the discharge water tank is circulated through the capacitive deionization apparatus.

9. The capacitive deionization process according to claim 1, wherein the discharging step is performed after the charge water in the capacitive deionization apparatus is completely removed from the capacitive deionization apparatus in the charging step.

10. The capacitive deionization process according to claim 1, wherein the discharging step is performed after the charge water in the capacitive deionization apparatus is completely removed from the capacitive deionization apparatus in the charging step.

11. The capacitive deionization process according to claim 10, wherein the charging step is performed after the discharge water in the capacitive deionization apparatus is completely removed from the capacitive deionization apparatus in the discharging step.

12. The capacitive deionization process of claim 1, wherein the charge water providing step comprises: adding lithium carbonate into the charge water and then adding barium hydroxide into the charge water to convert lithium carbonate into lithium hydroxide.

* * * * *